(No Model.)

E. K. HILL.
BICYCLE SPRING.

No. 275,910. Patented Apr. 17, 1883.

WITNESSES:
Lincoln Holland.
E. F. Tolman.

INVENTOR;
Edward K. Hill.

N. PETERS, Photo-Lithographer, Washington, D. C.

UNITED STATES PATENT OFFICE.

EDWARD K. HILL, OF WORCESTER, MASSACHUSETTS.

BICYCLE-SPRING.

SPECIFICATION forming part of Letters Patent No. 275,910, dated April 17, 1883.

Application filed January 19, 1883. (No model.)

*To all whom it may concern:*

Be it known that I, EDWARD K. HILL, of Worcester, Massachusetts, have invented certain new and useful Improvements in Bicycle-Springs, of which the following is a specification, the annexed drawings forming a part thereof.

Figure 1:
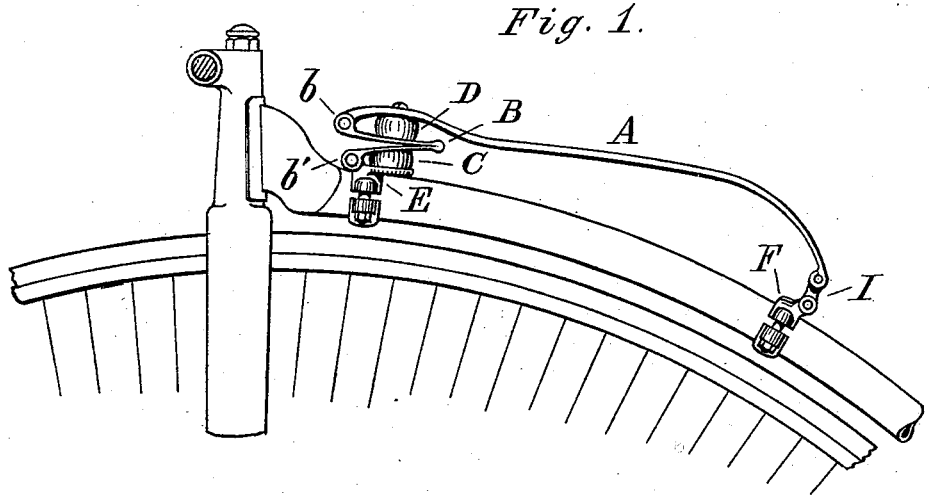
Figure 3:
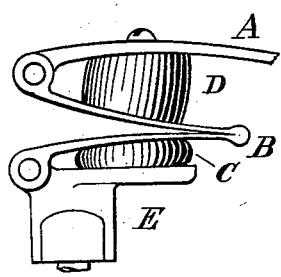
Figure 5:
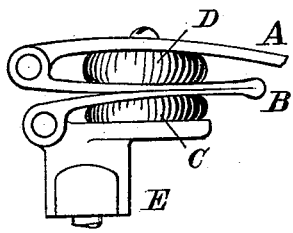
Figure 6:
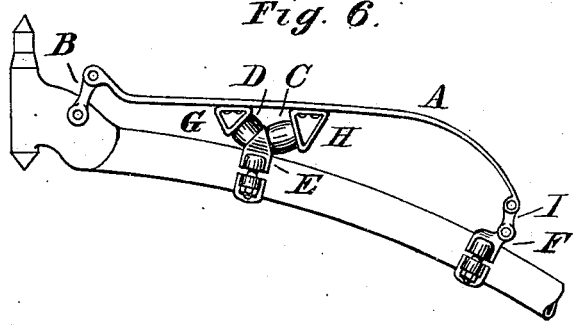

Figure 1 is an elevation of a spring in place on a bicycle embodying these improvements. Figs. 2, 3, 4, and 5 are enlarged views of a portion of this spring, illustrating its action. Fig. 6 is an illustration of the application of these improvements to an ordinary spring.

The ordinary flat spring, as applied to the bicycle, is deficient in several respects. Its necessary mode and place of attachment to the neck of the perch is such that the easiest part of the spring is toward the rear end, whereas the rider tends to place his weight as far forward as possible, thus necessarily sitting over the hardest part of the spring. Again, the ordinary spring is so attached to the perch as to deflect only in an up-and-down direction, being capable of absorbing only such up-and-down deflections, and these result from the passage of the large wheel over obstacles in the road. The small wheel, in passing over these obstacles, also moves in an up-and-down direction; but, unlike the large one, its movement is transmitted by the perch about the center of the large wheel until, at the head of the bicycle, it becomes horizontal. The rider is therefore subjected to the vertical jolting of the large wheel and the horizontal jolting from the small wheel, the former of which is imperfectly relieved by the ordinary spring, and the latter not at all.

It is the object of this improvement to overcome these objections.

Figure 2:
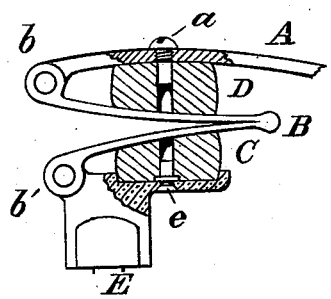
Figure 4:
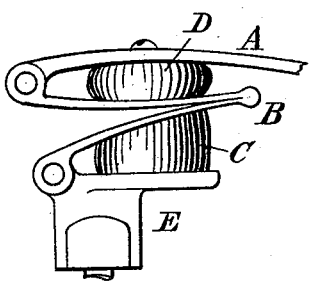

In Fig. 1, A is an ordinary flat spring, the head of which rests upon and has a jointed connection with the end *b* of a double secondary spring, B, which has a similar jointed connection at *b'* to a clamp-clip, E, by which the whole may be conveniently attached to the perch of the bicycle. Between the lower member of the spring B and a projecting portion of the clip E is interposed a rubber buffer, C, and between the upper member and the main spring A is another rubber buffer, D. The action of this combination is as follows: The main spring acts to a certain extent in relieving the rider from the vertical jolting of the front wheel in the usual manner; but, in addition, the secondary spring B allows an up-and-down motion to the head of A, thus giving easier action where the larger part of the rider's weight rests. The rubber buffers share in this action of the secondary spring, adding their reactionary force, and serving as buffers to prevent too great a deflection or to prevent contact of the parts. The position of the described parts at the extremes of motion is shown in Figs. 2 and 5.

The jointed connections of B to the clip E and spring A permit a certain amount of horizontal motion to the latter, which motion, being back and forth, will cause the tail of the spring B to tilt up and down against the rubber buffers C D, the yield of the rubber allowing this motion and governing its amount. Thus in Fig. 3 A is thrown back, tilting B down, compressing C, and allowing D to expand, while in Fig. 4 A is in a forward position, tilting B up, compressing D, and allowing C to expand. In order that the horizontal motion may take place in the spring A, its tail must be attached to the bicycle-perch in such a manner as to admit of this motion. In Fig. 1 it is shown attached by means of a link, I, and a clamp-clip, F; but any equivalent device may be used.

It is evident that the spring A is, under the action of sufficient force, free to move vertically or horizontally and in any path combining these two; or, to correctly state the mode of operation of the devices, the spring, with the rider's weight upon it, remains stationary by inertia, while the points of attachment are free to follow all the vertical and horizontal joltings to which the bicycle is subjected.

The device consisting of a secondary spring and two buffers, in combination with a main spring, is capable of a variety of applications. Instead of being under the head of the spring only, it may support the tail also, taking the place of the link I. The horizontal motion may be obtained in the ordinary flat spring without the secondary spring, in the manner illustrated in Fig. 6. The head and tail of the spring A are supported by the rocking links B and I, thus being free to move horizontally.

This motion is resisted by the rubber buffers C D, which are held in a standard made fast to the perch, or in cupped sides of a projection on a clamp-clip, E, and which bear against the abutting pieces G H, made fast to or a part of the spring A. It is evident that this arrangement is capable of the same action as that previously described, with the exception of the lack of the vertical action of the secondary spring on the head of spring A. This vertical action is, however, obtained to a certain extent in the ordinary flat spring. As in the case before described, the inertia of the rider causes the spring to remain stationary, while the perch, through the attached clip E, by compressing the rubber buffer, is partaking of the vertical and horizontal motions from the jolting of the wheels.

It may be desired that the main spring shall have the horizontal motion without the action of the secondary spring in a vertical direction, which may be accomplished by making B, Fig. 1, a solid link instead of a spring-link, when, in combination with the rubber buffers, it will allow a horizontal movement to the spring A, in the manner before described. Both ends of the spring A may be attached to the perch by this device.

It is evident that this improvement and the modifications described may be attached to the bicycle in any convenient manner, as well as by the clamp-clips shown in the drawings.

For constructional convenience, the spring B may be made in two parts and riveted together, or joined in any other desired way.

The buffers, herein described as rubber, may be of any elastic material or metal springs.

What I claim as my invention, and desire to secure by Letters Patent, is—

1. A link having a jointed attachment to the perch and to the seat-spring of a bicycle, which link is in itself a spring, for the purpose of attaching the seat-spring to the perch, substantially as specified.

2. A link having a jointed attachment to the perch and to the seat-spring of a bicycle, which link is in itself a spring, made in two parts, joined by riveting or other means, substantially as and for the purpose specified.

3. The combination of a link having a jointed attachment to the perch and to the seat-spring of a bicycle, which link is in itself a spring, with rubber or metal springs, substantially as and for the purpose specified.

4. The combination of a bicycle seat-spring and a clamp-clip for attaching said spring to the perch, with a spring-link having jointed attachment to the seat-spring and the clamp-clip, substantially as specified.

5. A bicycle seat-spring attached to the perch by rocking links, in combination with buffers abutting against the perch or a fixture thereon, and the spring, or an attachment to the spring, substantially as and for the purpose specified.

6. The method of attaching bicycle seat-springs to the perch by a spring-link jointed to the seat-spring and to the perch, substantially as specified.

EDWARD K. HILL.

Witnesses:
HERBERT C. HASTINGS,
E. F. TOLMAN.